United States Patent
Fraas et al.

(10) Patent No.: US 6,284,969 B1
(45) Date of Patent: *Sep. 4, 2001

(54) HYDROCARBON FIRED THERMOPHOTOVOLTAIC FURNACE

(75) Inventors: Lewis M. Fraas, Issaquah; William P. Mulligan, Seattle; John E. Samaras, Seattle; Lucian G. Ferguson, Seattle, all of WA (US)

(73) Assignee: JX Crystals Inc., Issaquah, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,513

(22) Filed: Aug. 20, 1998

Related U.S. Application Data

(63) Continuation-in-part of application No. 09/079,395, filed on May 15, 1998, now Pat. No. 6,218,607.
(60) Provisional application No. 60/056,098, filed on Aug. 20, 1997.

(51) Int. Cl.$^7$ .................................................. H01L 31/00
(52) U.S. Cl. ............................................................ 136/253
(58) Field of Search ............................................. 136/253

(56) References Cited

U.S. PATENT DOCUMENTS

| | | | |
|---|---|---|---|
| 3,433,676 | 3/1969 | Stein ..................... | 136/253 |
| 3,751,303 | 8/1973 | Kittl ..................... | 136/253 |
| 3,929,510 | 12/1975 | Kittl ..................... | 136/253 |
| 4,234,352 | 11/1980 | Swanson ............... | 136/253 |
| 4,707,560 | 11/1987 | Hottel et al. .......... | 136/253 |
| 4,776,895 | 10/1988 | Goldstein .............. | 136/253 |

(List continued on next page.)

FOREIGN PATENT DOCUMENTS 63-316486   12/1988   (JP) .

OTHER PUBLICATIONS

Fraas, A.P., "Heat Exchangers Operating on Radiant Energy," *Heat Exchanger Design,* Wiley–Interscience Publication, pp. 365–382, (U.S.A. 1989).

Fraas, A.P., "Characteristics of Heat Sources, Engineering Evaluation of Energy System," pp. 96–125, McGraw–Hill (U.S.A. 1982).

Pelka, D.G. et al., "Natural Gas–Fired Thermophotovoltaic System," Proceedings of the 32nd International Power Sources, pp. 110–123, (U.S.A. 1986).

(List continued on next page.)

*Primary Examiner*—Mark Chapman
(74) *Attorney, Agent, or Firm*—James Creighton Wray; Meera P. Narasimhan

(57) ABSTRACT

The present invention is a hydrocarbon fired thermophotovoltaic furnace having a non-fused silica tube. In a preferred embodiment, the furnace has an infrared emitter tube having a top end and a bottom end and a substantially transparent non-fused silica window tube having a closed top end. The window tube is positioned concentrically around the infrared emitter tube, and the infrared emitter tube is in fluid communication with the window tube. The window tube is preferably composed of Lucalox (alumina or Chromolux), magnesia, yterria, titania, spinel, stablized zirconia or yterria alumina garnet. In another preferred embodiment, the furnace has a radiator tube having a top end and a bottom end and an infrared emitter tube having a closed top end. The infrared emitter tube is positioned concentrically around the radiator tube, and the radiator tube is in fluid communication with the infrared emitter tube. Fluid flows from the inner tube to the outer tube. Also disclosed is a fuel injector having a cup member press fit to the upper end of a hollow tube. An annular cup is positioned adjacent a top end of the cup member and a cap is positioned adjacent the annular cup opposite the cup member. A jet shim is positioned between the annular cup and the cap. The jet shim has a plurality of etched radial channels formed therein. Gaseous fuel flows through the etched radial channels between a flat upper rim of the cup member and a flat lower surface of the cap. The shim also has an inner hub held between a flat inner surface of the cup member and the flat lower surface of the cap.

28 Claims, 3 Drawing Sheets

U.S. PATENT DOCUMENTS

| | | | |
|---|---|---|---|
| 4,906,178 | 3/1990 | Goldstein et al. | 431/79 |
| 4,976,606 | 12/1990 | Nelson | 431/79 |
| 5,044,939 | 9/1991 | Dehlsen | 432/25 |
| 5,080,724 | 1/1992 | Chubb | 136/253 |
| 5,091,018 | 2/1992 | Fraas et al. | 136/246 |
| 5,096,505 | 3/1992 | Fraas et al. | 136/246 |
| 5,118,361 | 6/1992 | Fraas et al. | 136/246 |
| 5,123,968 | 6/1992 | Fraas et al. | 136/246 |
| 5,217,539 | 6/1993 | Fraas et al. | 136/246 |
| 5,248,346 | 9/1993 | Fraas et al. | 136/244 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,389,158 | 2/1995 | Fraas et al. | 136/244 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |
| 5,512,109 | 4/1996 | Fraas et al. | 136/253 |
| 5,551,992 | 9/1996 | Fraas | 136/253 |
| 5,560,783 | 10/1996 | Hamlen | 136/253 |
| 5,601,661 | 2/1997 | Milstein et al. | 136/253 |
| 5,616,186 | 4/1997 | Fraas et al. | 136/253 |
| 5,651,838 | 7/1997 | Fraas et al. | 136/253 |
| 5,865,906 | 2/1999 | Ferguson et al. | 136/253 |

OTHER PUBLICATIONS

Morgan, M.D. et al., "Radioisotope Thermal Photovoltaic Application of the GaSb Solar Cell," NASA SPRAT Conference, pp. 349–358, (U.S.A. 1989).

E. Kittl and G. Guazzoni, "Design Analysis of TPV–Generator System," Proceedings of the 25th Annual Power Sources Conference, May 1972, pp. 106–110.

A.C. Day, W.E.Horne and M.D. Morgan, "Application of the GaSb Solar Cell in Isotope–Heated Power Systems," Conference Record of the 21st IEEE Photovoltaic Specialists Conference, Kissimmee, FL., May 1990, pp. 1320–1325.

Doellner, O.L., "Aircraft Photovoltaic Power–Generating System," PhD. Thesis (Appendix A), University of Arizona, (U.S.A. 1991).

Fraas, A.P., "Design and Development Tests of Direct–Condensing Potassium Radiators," USAEC Report Conf–651026, (U.S.A. 1965).

Fraas L. et al., "Status of TPV Commercial System Development Using GaSb Infrared Sensitive Cells," Presented at the Second World Photovoltaic Specialists Conference, Vienna, Austria, Jul. 6–10, 1998.

Whitaker, T., "GaSb Shines Brighter Than The Midnight Sun," Compound Semiconductor, Fall I, 1998, pp. 33–34.

H. Höfler, P. Würfel and W. Ruppel, "Selective Emitters For Thermophotovoltaic Solar Energy Conversion," Solar Cells, 10(Dec. 1983), pp. 257–271.

L.D. Woolf, "Optimum Efficiency of Single and Multiple Bandgap Cells in Thermophotovoltaic Energy Conversion," Solar Cells, 19(1986–1987), pp. 19–38.

H. Höfler, et al., "Selective Absorbers and Interference Filters for Thermophotovoltaic Energy Conversion," Proceedings of the 5th E.C. Photovoltaic Solar Energy Conference Athens, Greece, Oct. 1983, pp. 225–229.

D. L. Chubb, "Reappraisal of Solid Selective Emitters," Conference Record of the 21st IEEE Photovoltaic Specialists Conference, May 1990, Kissimmee, FL., pp. 1326–1333.-

HYDROCARBON FIRED THERMOPHOTOVOLTAIC FURNACE

CROSS-REFERENCE TO RELATED APPLICATIONS

This application is a continuation-in-part of U.S. patent application Ser. No. 09/079,395 filed May 15, 1998, now U.S. Pat. No. 6,218,607 and this application also claims the benefit of U.S. Provisional Application No. 60/056,098, filed Aug. 20, 1997. These earlier applications and their listed references are incorporated herein by reference.

FIELD OF THE INVENTION

The present invention relates generally to thermophotovoltaic (TPV) generators. More particularly, the invention relates to a hydrocarbon fired thermophotovoltaic furnace having a non-fused silica tube.

BACKGROUND

Thermophotovoltaic (TPV) generators are combined with residential gas furnaces in a number of ways. One method is to treat the TPV unit as a first heat stage. This method requires that the single stage furnace be sized to handle the coldest days. To ensure that the furnace will be able to maintain the space temperature, the furnace is typically oversized. A TPV first stage that is 20% of the main furnace output is sufficient for 50% or more of the heating hours, and comfort is improved since the heat output more closely matches the space heat load. The furnace blower operates at a low rpm that matches the pressure output of the TPV generator. This operation is done with a PWM DC motor, a device that is already available in the HVAC industry. Two stage heat thermostats are commercially available. The TPV controls ensure safety of the hybrid system. The principal feature is enhanced comfort. Temperature swings are reduced at low loads, and continuous air movement also provides filtration. The TPV add-on serves as a backup furnace in the event there is a loss of power. The TPV unit is not able to satisfy the second stage load, but it at least maintains a significant space temperature relative to outdoor conditions. With the addition of electrical storage, full furnace output may be provided for a duration determined only by the amount of storage provided. The backup furnace may be done without using the TPV unit as a first stage, but the added value of a first stage operation makes the most sense.

The small, portable, cylindrical TPV generator provides electricity. A significant market exists for self-powered furnaces. A forced air self-powered furnace requires a 200 W DC blower and a 200 W electric generator to operate the blower. An infrared (IR) emitter and TPV cells provide electric power but require a new redesign for each different model furnace. Furthermore, the furnace requires 200 W of electricity, and a potential customer would have to purchase a new TPV powered furnace.

SUMMARY OF THE INVENTION

The present invention is a hydrocarbon fired thermophotovoltaic furnace having a non-fused silica tube. In a preferred embodiment, the furnace has an infrared emitter tube having a top end and a bottom end and a substantially transparent non-fused silica window tube having a closed top end. The window tube is positioned concentrically around the infrared emitter tube, and the infrared emitter tube is in fluid communication with the window tube. The window tube is preferably composed of Lucalox (alumina or Chromolux), magnesia, yterria, titania, spinel, stablized zirconia or yterria alumina garnet. In another preferred embodiment, the furnace has a radiator tube having a top end and a bottom end and an infrared emitter tube having a closed top end. The infrared emitter tube is positioned concentrically around the radiator tube, and the radiator tube is in fluid communication with the infrared emitter tube.

Fluid flows from the inner tube to the outer tube. For either of the above embodiments, either the top end of the inner tube is spaced from the closed top end of the outer tube to permit fluid to flow between the ends of the tubes or the top end of the inner tube abuts the closed top end of the outer tube and the inner tube has a plurality of holes formed therethrough.

The furnace has low bandgap cells positioned distally around the outer tube and has a plurality of dielectric filters individually positioned on each cell.

The furnace has a fuel tube axially aligned with and positioned below the inner tube. A fuel inlet is mounted at a base of the fuel tube, and a fuel injector is mounted at a top of the fuel tube. A venturi is positioned adjacent to and around the fuel injector. An axial fan is positioned below the venturi. The fan forces combustion air into the venturi. A photovoltaic array is preferably positioned around the outer tube for supplying electricity to the combustion air fan.

A combustion air tube surrounds the fuel tube and directs combustion air to the venturi. A combustion chamber is positioned beyond the fuel injector and the venturi. Ignitors positioned in a top end of the fuel injector start the combustion of the fuel. An exhaust conduit surrounds the outer tube and extends down along the combustion air tube.

A heat exchanger is connected to the exhaust conduit. Heat exchanger fins are positioned in the exhaust conduit and extend into the combustion air tube for preheating combustion air. The heat exchanger also includes a recuperator. The recoperatur has a recuperator tube with slots formed therein and arranged helically. Fins extend through the slots from outside the recuperator tube to inside the recurperator tube. Preferably, the recuperator fins are either trapezoidal or rectangular. The trapezoidal shaped recuperator fins have shoulders which abut an outside of the recuperator tube.

In a preferred embodiment, the fuel injector includes a generally hollow tube having an upper end and a lower end and a cup member press fit to the upper end of the hollow tube. The cup member has a central hole formed therein for receiving a fastener. A plurality of holes are also formed in the cup member. The holes are positioned radially around the central hole and are spaced equidistantly spaced from the central hole and from each other. An annular cup is positioned adjacent a top end of the cup member and a cap is positioned adjacent the annular cup opposite the cup member. A jet shim is positioned between the annular cup and the cap. The jet shim has a plurality of etched radial channels formed therein. Gaseous fuel flows through the etched radial channels between a flat upper rim of the cup member and a flat lower surface of the cap. The shim also has an inner hub held between a flat inner surface of the cup member and the flat lower surface of the cap.

Finally, the furnace includes means for attaching the furnace to an existing air duct system.

These and further objects and features of the invention are apparent in the disclosure, which includes the above and ongoing written specification, with the drawings.

DETAILED DESCRIPTION OF THE PREFERRED EMBODIMENTS

Figure 1A:
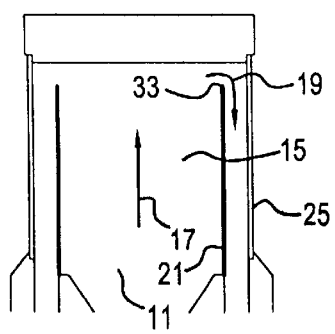
FIGS. 1A–D show alternative emitter configurations.

Four alternative infrared emitter configurations for use with hydrocarbon burners and low bandgap thermophotovoltaic cells are shown in FIGS. 1A through 1D. In each case, the hydrocarbon/air mixture is burned near the bottom 11 of an inner tube. The hot flue gases 15 flow up 17 inside the inner tube and then down 19 outside the inner tube while being confined by an outer tube. The inner and outer tubes are coaxial. In configurations 1A and 1B, the inner tube 21, 23 is the infrared emitter tube, and the outer tube is a transparent window tube 25. In configurations 1C and 1D, the outer tube is the infrared emitter tube 27, and the inner tube 29, 31 is a radiator tube which transfers energy to the outer tube by radiation. In the embodiments shown in FIGS. 1A and 1C, the inner tube 21, 29 is open at its top end 33 so that the gas flow 17, 19 is primarily axial. In the embodiments shown in FIGS. 1B and 1D, the inner tube 23, 31 has a hole pattern 35 so that flow 37, 39 is radial and axial.

Figure 1B:
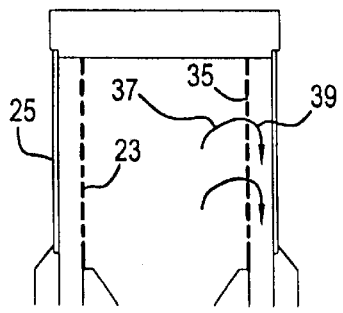
Figure 1C:
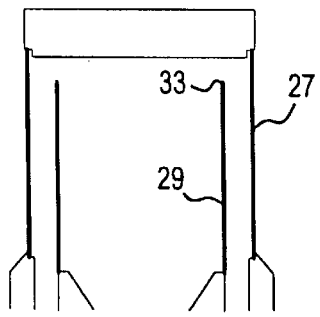
Figure 1D:
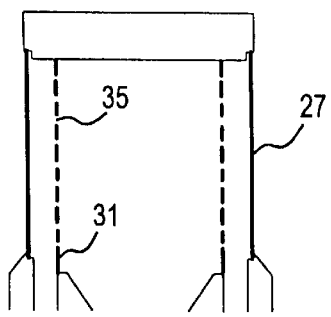

In the embodiments shown in FIGS. 1A and 1B, the inner emitter tube 21, 23 has been a cobalt doped matched emitter, while the outer tube 25 has been fused silica. In the embodiments shown in FIGS. 1C and 1D, the outer tube 27 has been a cobalt doped matched emitter, and the inner tube 29, 31 has either been a matched emitter or a SiC tube. All of these material combinations have problems. The problem with the 1C & 1D configurations is that the inner tube runs much hotter than the outer tube 27. Therefore, if the outer emitter temperature is the target temperature of 1400° C., then the inner radiator tube temperature can be as high as 1700° C. Material durability of the radiator tube 29, 31 is then a problem. Furthermore, if the inner tube is a SiC tube, shine-through of the black body longer wavelength radiation will destroy the selectivity inherent in the matched emitter. Empirically because of the above identified problems, the 1A and 1B configurations are preferred. However, there are still problems with these configurations. The primary problem is the durability of the fused silica and the fact that hot flue gases are impinging on the fused silica. Currently, the matched emitter can operate at a temperature up to 1300° C. at which point the fused silica has arrived at its limit temperature of 1100° C.

Major improvements are made by replacing the fused silica with a higher temperature capable transparent window material. Improved transparent window materials are Lucalox (alumina or Chromolux), magnesia, yttria, titania, spinel, stabilized zirconia, or yttria alumina garnet (YAG). Lucalox is a 99.9% alumina transparent material used in large quantities for making sodium vapor lamps. General Electric (GE) sells Lucalox lamp tubes with diameters of 0.34" and lengths of 10" currently for $5 each. GE has indicated that 3.5" diameter Lucalox tubes can be made. The process for making Lucalox was originally described in 1962 in U.S. Pat. No. 3,026,210. Improvements were described in 1973 in U.S. Pat. Nos. 3,711,585 and 3,769,049.

Major improvements in hydrocarbon fired TPV generators using low bandgap cells and selective or matched emitters are made by placing a Lucalox transparent window between the IR emitter and the cells. At least four areas of improvement can be enumerated. First, the emitter and shield can now operate at higher temperatures, e.g., 1400° C. and 1200° C. respectively. This results in higher power density. Second, the system durability will be increased because the Lucalox operates well below its limit temperature of 1700° C., whereas the fused silica presently would have been operating near its limit temperature.

The third and fourth areas of improvement are more subtle and relate to spectral control and system efficiency. The third area of improvement is an immediate decrease in cell heat load and an increase in the usable fraction of emitter radiation, because the Lucalox is transparent (corresponding to low emissivity) to a longer wavelength of seven (7) microns instead of the shorter wavelength of four (4) microns associated with fused silica. Table 1 quantifies this effect. Note that the cell usable wavelengths are wavelengths less than two (2) microns and that the two (2) to four (4) micron band can be handled with a good dielectric filter. As Table 1 shows, the heat load on a cell decreases from 12 $W/cm^2$ for the fused silica case to 8 $W/cm^2$ for the Lucalox case. This leads to an increase of radiation to electric efficiency by a factor of 1.5.

TABLE 1

| Matched emitter | Fused silica | Lucalox |
| --- | --- | --- |
| 1400 ° C., <2 micron 6 $W/cm^2$ | 1200 ° C., >4 micron 6 $W/cm^2$ | 1200 ° C., >7 micron 2 $W/cm^2$ |

The fourth area of improvement is even more subtle. If a filter on a cell would efficiently reflect all wavelengths greater than two (2) microns, then the temperature of a fused silica or Lucalox window would be driven up to the emitter temperature of 1400° C. This is acceptable for Lucalox but not for fused silica. The efficiency improvement associated with an improved filter is very desirable.

Figure 2:
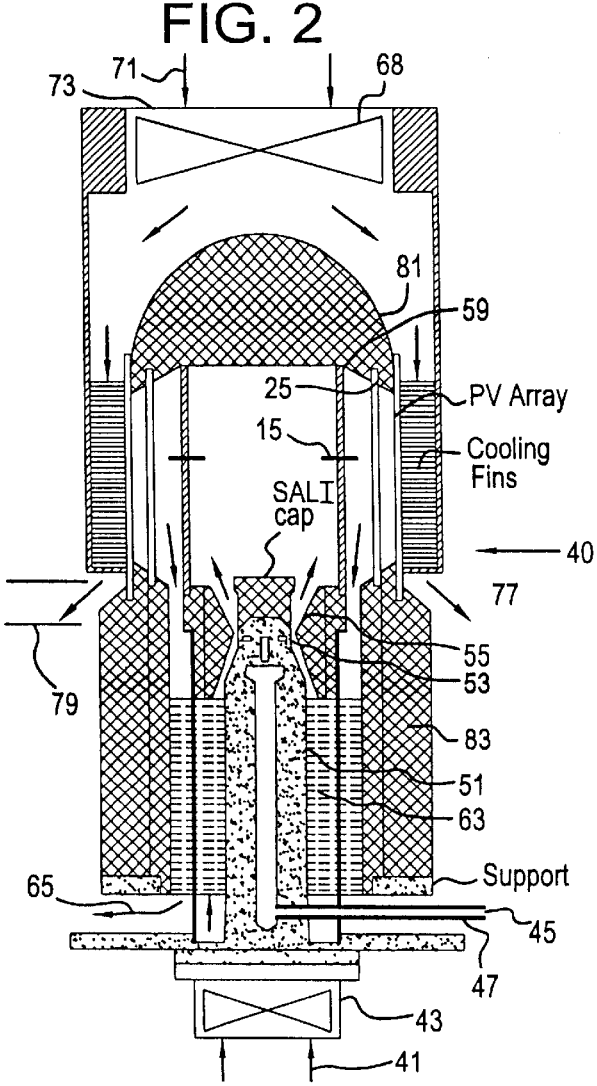
FIG. 2 is a schematic cross-section of a furnace.

A Lucalox shield 25 is shown in FIG. 2, which is a cross-section of a generator and furnace with emitter configuration 1B.

In generator/furnace 40, combustion air 41 is supplied by a small fan 43. Fuel 45 flows through tube 47 to a conduit 49 in fuel injector base 51 to a fuel injector 53 at the neck of venturi 55. Ignitors in SALI cap 57 at the top of the fuel injector 53 start combustion which heats the porous emitter 59. Wires to the ignitors run within the fuel injector base 51. Combustion gases 61 flow axially along and radially through the emitter 59, down through the heat exchanger 63 and out through exhaust 65. The heat exchanger 63 acts as a recuperator and preheats the combustion air 41.

The emitter 59 provides infrared rays through the transparent window 25 to a photovoltaic (PV) array 67, which supplies electricity to a storage battery for operating fan 43 and circulating fan 69. Air 71 supplied from a return duct 73 or ambient air is blown over cooling fins 75 to cool the photovoltaic (PV) array 67. The heated air 77 is conducted to a hot air duct 79. Dome insulation 81 maintains combustion heat in the combustion chamber. Insulation layers 83 confine the exhaust heat for transfer to the heat exchanger 63 in the recuperator to preheat the combustion air.

Figure 3:
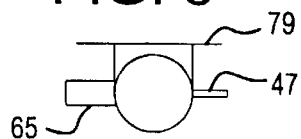
FIG. 3 is a top view of a TPV furnace mounted on an existing hot air duct.
Figure 4:
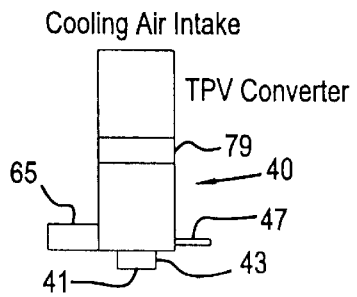
FIG. 4 is a front view of the TPV furnace shown in FIG. 3.

Preferably, an auxiliary TPV cylinder 40 is bolted onto an existing air duct system 79 as is shown in FIGS. 3 and 4. The furnace bolt-on cogenerator unit 40 attaches to the furnace hot air duct 79. The TPV cogenerator unit produces 100 W of electricity to charge a battery bank (not shown) and produces approximately 10,000 BTU per hour of heat. The modified furnace has three states of operation: off in the summer, low in cool weather with only the TPV cylinder 40 in operation, and high with both the main furnace and the TPV unit on for heating a cold house quickly or for the few very cold winter days.

Among several significant advantages, a first advantage is that the invention provides one universal solution for most furnaces. A second advantage is that the invention applies to all existing furnace owners, not just new furnace customers. The invention is an economical solution for self power, because a smaller TPV cogenerator system is on for a much longer period of time than the larger furnace needs to be on. The battery shifts the load requirement from high power for short durations to low power for longer durations. A lower power TPV cogenerator unit is more affordable for self power for a large number of customers.

The center of the unit 40 has a conduit to flow heated air to the hot air duct 79. A natural gas fuel inlet tube 47 supplies fuel to the cogenerator unit 40. Combustion air 41 is preheated by the heat exchanger in the recuperator section 85. The TPV converter 87 supplies electricity to battery (not shown) which drives the combustion fan 43 and the inlet fan for cooling air 71.

A preferred fuel injector 53 is shown in FIGS. 5 through 9. A ⅞ inch diameter stainless steel tube 91 has press fitted at its upper end a cup member 93. Cup member 93 has a central hole 95 tapped to receive a screw. Eight (8) ¹⁄₁₆" diameter holes 97 are formed in a circular arrangement. The holes 97 feed an annular cup 99 at the top of the cup member. A jet shim 101 is placed between the cup and the cap 103. Fuel flows from the annular cup 99 radially through the controlled etched radial channels 105 in shim 101. The gaseous fuel flows through the 0.010"×0.003" channels 105 between the flat upper rim 107 of the cup member 93 and the flat lower surface 109 of the cap 103. The inner hub 111 of shim 101 is held between the flat inner surface 113 of cup member 93 and the flat surface of the cap.

Figure 5:
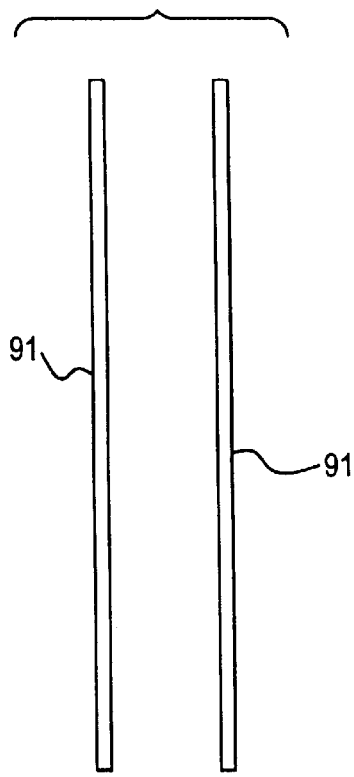
FIG. 5 is an exploded view of parts of the fuel injector.
Figure 6:
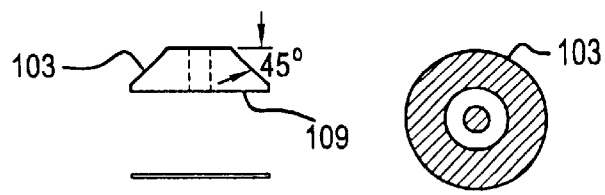
FIG. 6 is a top view of the fuel injector cap.
Figure 7:
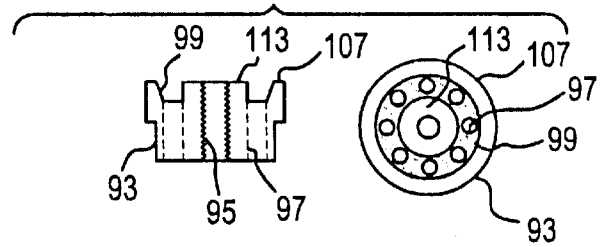
FIG. 7 is a top view of the fuel injector cup.
Figure 8:
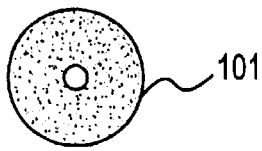
FIG. 8 is a top view of the fuel injector shim.
Figure 9:
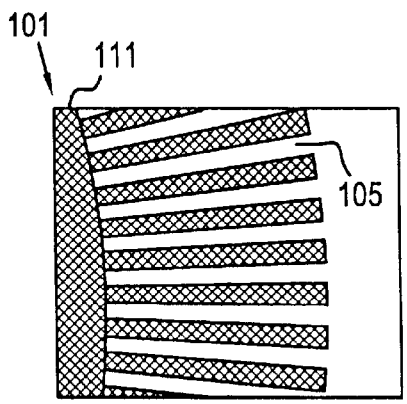
FIG. 9 is an enlarged partial top view of the shim.

The jet shim 101 shown in FIGS. 8 and 9 is assembled as shown in FIG. 5. The purpose of the jet shim is two-fold. First, the shim is used to provide precision spacing (typically 0.003") between the cap and the cup of the fuel injector. Accurate control of this gap is necessary to regulate fuel flow into the combustion chamber. Second, since fuel can flow only in the chemically etched channels of the shim, the shim delivers small, discrete jets of fuel to the venturi neck of the combustion chamber. Typically, there are more than one hundred and fifty (150) jets, depending on the diameter, channel width and channel pitch of the shim 101. Typically, exit dimensions of each jet will be 0.010" wide by 0.003" high, depending on channel width and shim thickness, respectively. Because air flows up through the venturi neck and perpendicularly intersects the plane of discrete fuel jets, this configuration provides excellent fuel to air mixing.

Figure 10:
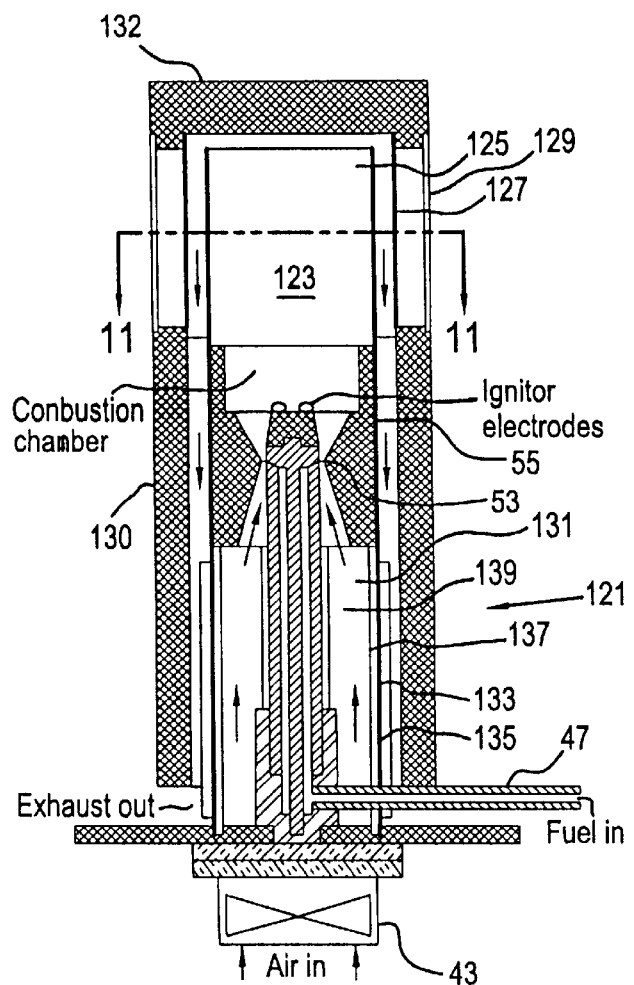
FIG. 10 is a schematic cross-sectional elevation of a furnace/generator.
Figure 11:
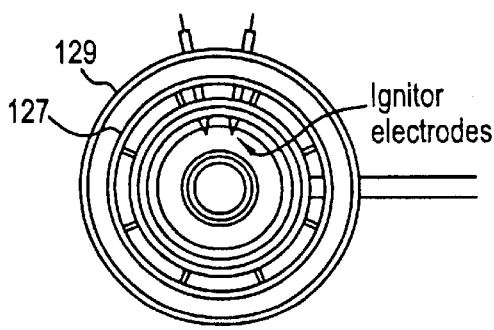
FIG. 11 is a horizontal cross-section taken along line B—B in FIG. 10.

A thermophotovoltaic (TPV) system 121 is shown in FIGS. 10 and 11. A fan 43 is used to force combustion air up through a venturi 55. Fuel introduced at the venturi neck with a radial fuel injector 53 mixes with the combustion air and burns in the combustion chamber 123. The energy from the hot combustion gases 125 is transferred to the radiation emitters 127, which radiate energy through a shield window 129 to a surrounding photovoltaic array. Combustion gases 125 then continue on a downward path through a heat exchanger 131. Insulation 130, 132 surrounds the heat exchanger and covers the combustion chamber.

High-efficiency TPV burners require recuperation of heat energy from the combustion exhaust stream. Recuperated energy is used to preheat the intake combustion air to increase the combustion flame temperature, and thus increase overall system efficiency. Swirling of the combustion gas products is also known to increase heat transfer to the emitters of the TPV system. The present invention improves both heat exchanger efficiency and combustion gas swirl in a TPV system.

A cylindrical tube 133 forms the inner and outer walls of the heat exchanger 131. The tube is formed from high temperature materials such as stainless steel, inconel, copper-nickel alloys, alumina refractory, silicon carbide, or other high temperature ceramics or metal alloys. Alternatively, the tube is formed in two sections 135, 137 by a combination of two high temperature materials, or by combination of one high temperature material and a lower temperature material, such as aluminum.

Figure 12:
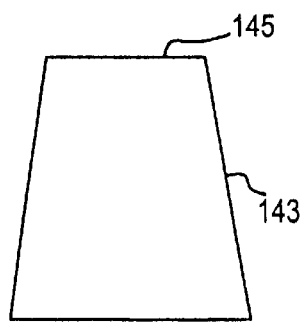
FIGS. 12 and 13 show shapes of heat exchanger fins.
Figure 13:
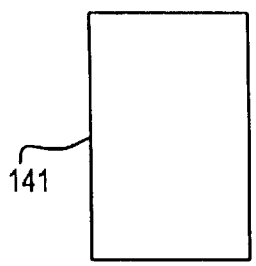

Slots are cut or milled in the cylindrical tube, and heat exchanger fins 139 are inserted through the tube wall. Fin materials include stainless steel, inconel, copper-nickel alloys, silicon carbide, boron nitride, or other high temperature ceramics or metal alloys with reasonably high thermal conductivity. Fins are flat plates, typically 0.010" to 0.200" thick and 0.060" to 2.000" wide. The length of the fins is determined by fin efficiency and insertion length geometrical constraints on both the hot and cold sides of the heat exchanger. The fins are either rectangularly shaped 141, or trapezoidally shaped 143, as shown in FIGS. 12 and 13. The short end 145 of the trapezoid is inserted through the cylinder 133 to the interior of the tube. The trapezoidal fin shape allows higher fin density. A shoulder milled on the fins assists in achieving the correct insertion depth. Fins are loose fitting, press fit, soldered, brazed or welded to the cylinder 133.

The fins are inserted in a staggered helical pattern. The helical pattern establishes a swirl flow of the intake air flowing in the interior (cold side) of the heat exchanger tube. The angle of the fins off horizontal is typically forty-five (45) degrees. This angle may vary over the length of the cylindrical tube to control the swirl. At the fan end of the heat exchanger, the fin angle is adjusted to match the natural swirl established by the fan, typically about fifty (50) degrees off horizontal and counter-clockwise. This helps minimize pressure drop though the heat exchanger. The swirl established in the intake air side of the heater exchanger is maintained, to some extent, through the venturi and combustion chamber, to give combustion gas swirl as energy is being transferred to the emitter surfaces.

The use of angled fins to establish a helical air flow pattern on both sides of the heat exchanger improves heat transfer by increasing the path length of the air through the heat exchanger, and thus increasing heat transfer area on both sides of the exchanger. The relatively short fin width of the fins and the staggered insertion pattern serves to periodically interrupt the boundary layers formed on the fin surfaces, improving heat transfer effectiveness. The fin width, stagger pattern, fin density and fin angle are determined by a tradeoff between pressure drop through the heat exchanger and improved heat transfer efficiency and combustion gas swirl.

Fabricating cylindrical ceramic emitters 59 with a combustion gas hole array by drilling holes through the ceramic cylinder with a diamond drill is a very tedious process.

The emitters are fabricated by a cloth laminate process in which a cellulose cloth is soaked in a wet ceramic powder slurry and wrapped around a cylindrical mandrel. A single cloth layer uses a pre-punched hole pattern in a flat sheet of cloth before wrapping the cloth around a mandrel. The holes tend to fill up with slurry, and the single layer emitters may crack in high temperature operation in a burner. A fiber reinforced multi-layer process achieves durability. Lining up the hole arrays in the multiple cloth layers is difficult. Hence, the diamond drill process.

In an alternative method for creating the required hole pattern, a flat thin flexible sheet is fabricated with a bump array on its upper surface. This sheet can be fabricated from a thermoplastic material like nylon by placing an aluminum plate on top of the material. The aluminum plate has an array of holes drilled in it. The nylon and aluminum plate are then heated. The plate is pressed down, pushing nylon bumps into the holes in the aluminum plate. Upon cooling, removing the aluminum plate yields the required thin flexible sheet with the required bump array on its upper surface.

The thin plastic sheet is wrapped around a cylindrical mandrel with the bump array facing outward. A first slurry soaked pre-punched cloth is wrapped around the cylindrical mandrel with the pre-punched holes in the cloth lined up with the bumps on the plastic sheet. The mandrel is wrapped with the reinforcing fibers arrayed between bumps. A second pre-punched cloth is dipped in slurry and wrapped around the mandrel, aligning the holes with the bumps. A third pre-punched cloth is dipped in doped slurry and wrapped around the mandrel with holes aligned with the bumps. After the cloths dry, the laminated green emitter with the bumped plastic sheet is slipped off the cylindrical mandrel. The plastic sheet is withdrawn from the inside of the green emitter, leaving an array of through holes in the emitter. Then the emitter is fired.

An advantage of the method in addition to the ease of manufacturing is great flexibility in the types of holes such as plus (+), slant (/), etc. The hole types give better heat transfer than simple drilled round holes.

A variation on the above method uses a bumped sheet composed of a different material that can be burned away during firing rather than peeled away prior to firing.

While the invention has been described with reference to specific embodiments, modifications and variations of the invention may be constructed without departing from the scope of the invention.

We claim:

1. A hydrocarbon fired thermophotovoltaic furnace, comprising:
   an infrared emitter tube having a top end and a bottom end;
   a substantially transparent non-fused silica window tube having a closed top end;
   said window tube positioned concentrically around said infrared emitter tube; and
   wherein said infrared emitter tube is in fluid communication with said window tube.

2. The furnace of claim 1 wherein said top end of said infrared emitter tube is spaced from said closed top end of said window tube.

3. The furnace of claim 1 wherein said top end of said infrared emitter tube abuts said closed top end of said window tube and wherein said infrared emitter tube has a plurality of holes formed therethrough.

4. The furnace of claim 1 wherein said window tube is composed of at least one of Lucalox (alumina or Chromolux), magnesia, yterria, titania, spinel, stablized zirconia or yterria alumina garnet.

5. The furnace of claim 1 further comprising low bandgap cells positioned distally around said window tube.

6. The furnace of claim 5 further comprising means for filtering wavelengths greater than two microns.

7. The furnace of claim 6 wherein said filtering means comprises a plurality of dielectric filters individually positioned on said cells.

8. The furnace of claim 1 further comprising:
   a fuel tube axially aligned with and positioned below said infrared emitter tube;
   a fuel inlet mounted at a base of said fuel tube;
   a fuel injector mounted at a top of said fuel tube;
   a venturi adjacent said fuel injector;
   a fan for forcing combustion air into said venturi;
   a combustion air tube surrounding said fuel tube for directing combustion air to said venturi;
   a combustion chamber beyond said fuel injector and said venturi;
   ignitors positioned in a top end of said fuel injector for starting combustion;
   an exhaust conduit surrounding said window tube and extending down along said combustion air tube; and
   a heat exchanger connected to said exhaust conduit and having fins positioned in said exhaust conduit and extending into said combustion air tube for preheating combustion air.

9. The furnace of claim 8 further comprising a photovoltaic array positioned around said window tube for supplying electricity to said combustion air fan.

10. The furnace of claim 8 wherein the heat exchanger further comprises a recuperator, having a recuperator tube with slots formed therein and arranged helically and having fins extending through said slots from outside said recuperator tube to inside said recurperator tube.

11. The furnace of claim 10 wherein said recuperator fins are trapezoidal.

12. The furnace of claim 11 wherein said recuperator fins have shoulders which abut an outside of said recuperator tube.

13. The furnace of claim 10 wherein said recuperator fins are rectangular.

14. The furnace of claim 1 further comprising means for attaching the furnace to an existing air duct system.

15. A hydrocarbon fired thermophotovoltaic furnace, comprising:
   a radiator tube having a top end and a bottom end;
   an infrared emitter tube having a closed top end;
   said infrared emitter tube positioned concentrically around said radiator tube; and
   wherein said radiator tube is in fluid communication with said infrared emitter tube.

16. The furnace of claim 15 wherein said top end of said radiator tube is spaced from said closed top end of said infrared emitter tube.

17. The furnace of claim 15 wherein said top end of said radiator tube abuts said closed top end of said infrared emitter tube and wherein said radiator tube has a plurality of holes formed therethrough.

18. The furnace of claim 15 further comprising low bandgap cells positioned distally around said infrared emitter tube.

19. The furnace of claim 18 further comprising means for filtering wavelengths greater than two microns.

20. The furnace of claim 19 wherein said filtering means comprises a plurality of dielectric filters individually positioned on said cells.

21. The furnace of claim 15 further comprising:
  a fuel tube axially aligned with and positioned below said radiator tube;
  a fuel inlet mounted at a base of said fuel tube;
  a fuel injector mounted at a top of said fuel tube;
  a venturi adjacent said fuel injector;
  a fan for forcing combustion air into said venturi;
  a combustion air tube surrounding said fuel tube for directing combustion air to said venturi;
  a combustion chamber beyond said fuel injector and said venturi;
  ignitors positioned in a top end of said fuel injector for starting combustion;
  an exhaust conduit surrounding said infrared emitter tube and extending down along said combustion air tube; and
  a heat exchanger connected to said exhaust conduit and having fins positioned in said exhaust conduit and extending into said combustion air tube for preheating combustion air.

22. The furnace of claim 21 further comprising a photovoltaic array positioned around said infrared emitter tube for supplying electricity to said combustion air fan.

23. The furnace of claim 22 wherein the heat exchanger further comprises a recuperator, having a recuperator tube with slots formed therein and arranged helically and having fins extending through said slots from outside said recuperator tube to inside said recurperator tube.

24. The furnace of claim 23 wherein said recuperator fins are trapezoidal.

25. The furnace of claim 24 wherein said recuperator fins have shoulders which abut an outside of said recuperator tube.

26. The furnace of claim 23 wherein said recuperator fins are rectangular.

27. The furnace of claim 15 further comprising means for attaching the furnace to an existing air duct system.

28. A fuel injector for a hydrocarbon fired thermophotovoltaic furnace, comprising:
  a generally hollow tube having an upper end and a lower end;
  a cup member press fit to said upper end of said tube;
  said cup member having a central hole formed therein for receiving a fastener;
  a plurality of holes formed in said cup member and spaced from and positioned radially around said central hole;
  an annular cup positioned adjacent a top end of said cup member;
  a cap positioned adjacent said annular cup opposite said cup member; and
  a jet shim positioned between said annular cup and said cap and having a plurality of etched radial channels formed therein;
  wherein gaseous fuel flows through said channels between a flat upper rim of said cup member and a flat lower surface of said cap; and
  wherein an inner hub of said shim is held between a flat inner surface of said cup member and said flat lower surface of said cap.

* * * * *

UNITED STATES PATENT AND TRADEMARK OFFICE
CERTIFICATE OF CORRECTION

PATENT NO. : 6,284,969 B1
DATED : September 4, 2001
INVENTOR(S) : Fraas et al.

Page 1 of 1

It is certified that error appears in the above-identified patent and that said Letters Patent is hereby corrected as shown below:

<u>Title page,</u>
Item [60], after "Provisional Application No. 60/056,098, filed on Aug. 20 1997" insert:
-- Provisional Application No. 60/046,588 filed on May 15, 1997 --.

Signed and Sealed this

Twenty-sixth Day of March, 2002

*Attest:*

JAMES E. ROGAN
*Attesting Officer*   *Director of the United States Patent and Trademark Office*